United States Patent
Sevenich et al.

(10) Patent No.: US 9,971,570 B2
(45) Date of Patent: May 15, 2018

(54) AUTOMATED GENERATION OF MEMORY CONSUMPTION AWARE CODE

(71) Applicant: Oracle International Corporation, Redwood Shores, CA (US)

(72) Inventors: Martin Sevenich, Palo Alto, CA (US); Sungpack Hong, Palo Alto, CA (US); Hassan Chafi, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 182 days.

(21) Appl. No.: 14/969,231

(22) Filed: Dec. 15, 2015

(65) Prior Publication Data
US 2017/0168779 A1    Jun. 15, 2017

(51) Int. Cl.
    *G06F 9/44* (2018.01)
(52) U.S. Cl.
    CPC ........................... *G06F 8/30* (2013.01)
(58) Field of Classification Search
    CPC .................................................. G06F 8/30
    See application file for complete search history.

(56) References Cited

U.S. PATENT DOCUMENTS

| | | | |
|---|---|---|---|
| 5,249,295 A | 9/1993 | Briggs et al. | |
| 5,339,238 A | 8/1994 | Benson | |
| 5,418,958 A | 5/1995 | Goebel | |
| 5,598,560 A | 1/1997 | Benson | |
| 5,659,754 A | 8/1997 | Grove et al. | |
| 5,805,863 A | 9/1998 | Chang | |
| 5,822,587 A | 10/1998 | McDonald | |
| 6,883,161 B1 | 4/2005 | Chovin et al. | |
| 6,922,830 B1 | 7/2005 | Schmidt | |
| 7,366,842 B1 | 4/2008 | Accoclla et al. | |
| 7,478,375 B1 | 1/2009 | Kersters | |
| 7,805,454 B2 | 9/2010 | Zhou | |

(Continued)

OTHER PUBLICATIONS

Hong. "Green-Marl: A DSL for Easy and Efficient Graph Analysis" 2012.*

(Continued)

*Primary Examiner* — Viva Miller
(74) *Attorney, Agent, or Firm* — Hickman Palermo Becker Bingham LLP

(57) ABSTRACT

Techniques generate memory-optimization logic for concurrent graph analysis. A computer analyzes domain-specific language logic that analyzes a graph having vertices and edges. The computer detects parallel execution regions that create thread locals. Each thread local is associated with a vertex or edge. For each parallel region, the computer calculates how much memory is needed to store one instance of each thread local. The computer generates instrumentation that determines how many threads are available and how many vertices and edges will create thread locals. The computer generates tuning logic that determines how much memory is originally needed for the parallel region based on how much memory is needed to store the one instance, how many threads are available, and graph size. The tuning logic detects a memory shortage based on the original amount of memory needed exceeding how much memory is available and accordingly adjusts the execution of the parallel region.

20 Claims, 8 Drawing Sheets

(56) References Cited

U.S. PATENT DOCUMENTS

| | | | |
|---|---|---|---|
| 7,900,193 B1 | 3/2011 | Kolawa et al. | |
| 8,019,785 B2 | 9/2011 | Moir et al. | |
| 8,234,233 B2 | 12/2012 | Zhou | |
| 8,359,583 B2 | 1/2013 | Chou et al. | |
| 8,473,928 B2 | 6/2013 | Park et al. | |
| 8,910,134 B2 | 12/2014 | Hong et al. | |
| 8,949,811 B2 | 2/2015 | Murthy | |
| 9,092,481 B2 | 7/2015 | Digaha | |
| 2001/0049682 A1 | 12/2001 | Vincent et al. | |
| 2002/0095668 A1 | 7/2002 | Koseki et al. | |
| 2004/0128661 A1 | 7/2004 | Ghosh | |
| 2004/0133747 A1 | 7/2004 | Coldewey | |
| 2004/0194074 A1* | 9/2004 | Shibayama | G06F 8/456 717/151 |
| 2004/0225996 A1 | 11/2004 | Venkatesan et al. | |
| 2005/0039175 A1 | 2/2005 | Tatge et al. | |
| 2005/0278451 A1 | 12/2005 | Yamashita | |
| 2006/0195463 A1* | 8/2006 | Bogner | G06Q 10/10 |
| 2008/0028380 A1 | 1/2008 | Guo et al. | |
| 2008/0134138 A1 | 6/2008 | Chamieh et al. | |
| 2009/0235237 A1 | 9/2009 | Song et al. | |
| 2010/0023700 A1 | 1/2010 | Chen | |
| 2010/0050156 A1 | 2/2010 | Bonanno et al. | |
| 2011/0055511 A1* | 3/2011 | Mantor | G06F 9/5016 711/170 |
| 2011/0055819 A1 | 3/2011 | Doyle | |
| 2011/0099541 A1 | 4/2011 | Blomstedt | |
| 2011/0138369 A1 | 6/2011 | Chandra | |
| 2011/0239197 A1 | 9/2011 | Dayan | |
| 2011/0276962 A1 | 11/2011 | Chambers | |
| 2012/0254845 A1 | 10/2012 | Yi et al. | |
| 2013/0031536 A1 | 1/2013 | De | |
| 2013/0086354 A1 | 4/2013 | Satish | |
| 2013/0097136 A1 | 4/2013 | Goldberg | |
| 2013/0139135 A1 | 5/2013 | Ditu | |
| 2013/0291113 A1 | 10/2013 | Dewey | |
| 2014/0019949 A1 | 1/2014 | Craymer | |
| 2014/0122812 A1* | 5/2014 | Hakura | G06T 15/005 711/144 |
| 2014/0189665 A1* | 7/2014 | Hong | G06F 8/443 717/151 |
| 2014/0306964 A1 | 10/2014 | Reddish | |
| 2014/0310619 A1 | 10/2014 | Fickenwirth | |
| 2014/0351820 A1* | 11/2014 | Lee | G06F 9/4881 718/103 |
| 2015/0007154 A1 | 1/2015 | Bharadwaj | |
| 2015/0040110 A1 | 2/2015 | Adl-Tabatabai | |
| 2015/0067639 A1 | 3/2015 | Pizlo | |
| 2015/0095698 A1* | 4/2015 | Ema | G06F 11/008 714/10 |
| 2015/0128151 A1* | 5/2015 | Rak | G06F 17/10 718/107 |
| 2015/0178405 A1 | 6/2015 | Hong et al. | |
| 2015/0331683 A1 | 11/2015 | Sevenich et al. | |
| 2015/0350324 A1 | 12/2015 | Hu et al. | |
| 2015/0355891 A1 | 12/2015 | Angerer | |
| 2016/0019228 A1 | 1/2016 | Hong | |
| 2016/0048607 A1 | 2/2016 | Raman | |
| 2016/0306896 A1 | 2/2016 | Paradies et al. | |
| 2016/0062776 A1 | 3/2016 | Stanfill | |
| 2016/0117358 A1 | 4/2016 | Schmid | |
| 2016/0335322 A1 | 11/2016 | Then et al. | |
| 2016/0364220 A1* | 12/2016 | Arai | G06F 8/452 |
| 2017/0024192 A1 | 1/2017 | Hong et al. | |

OTHER PUBLICATIONS

Liu et al., "iBFS: Concurrent Breadth-First Search on GPUs", SIGMOD'16, Jun. 26-Jul. 1, 2016, San Francisco, CA, USA, 14 pages.

Bak et al., "A Reference Interpreter for the Graph Programming Language GP 2", Proc. Graphs as Models (GaM 2015), vol. 181, dated Apr. 2015, 17 pages.

Banerjee et al., "Towards Logical Level Design of Big Data", dated Jul. 2015, 7 pages.

Cao et al. "GOP: A Graph-Oriented Programming Model for Parallel and Distributed Systems", New Horizons of Parallel and Distributed Computing 2005, pp. 21-36.

Chan et al., "Visual Programming Support for Graph-oriented parallel/distributed processing," Softw. Pract. Exper. 2005; 35: 1409-1439; Published online Jul. 29, in Wiley InterScience.

Chung et al., "Edge flipping in graphs." Department of Mathematics, University of California, San Diego, Jun. 22, 2011.

Dolby, "Automatic Inline Allocation of Objects", Proceedings of the ACM SIGPLAN Conference on Programming Language Design and Implementation, dated Jun. 1997, vol. 32, Issue 5, pp. 7-17.

Flores et al, "Semantic Data Management in Graph Databases", Tutorial at ESWC 2014-, dated 2014, 153 pages.

Freeman, Eve, "Getting Started with Neo4j and Cypher", https://www.airpair.com/neo4j/posts/getting-started-with-neo4j-and-cypher, dated Oct. 2016, 12 pages.

Hong et al., "Early Experiences in Using a Domain-Specific Language for Large-Scale Graph Analysis", ACM, Grades, dated 2013, pp. 1-6.

Ariful et al., "A Parallel Tree Grafting Algorithm for Maximum Cardinality Matching in Bipartite Graphs", dated May 25, 2015, 10 pages.

Hong et al., Green-Marl: A DSL for Easy and Efficient Graph Analysis, in ASPLOS '12, dated Mar. 6, 2012, 14 pages.

Yuechao, et al., "Multi-GPU Graph Analytics", dated Apr. 19, 2015, 12 pages.

Lopez, Karen, "Your Master Data Is a Graph: Are You Ready?", Oracle, dated Mar. 2015, 14 pages.

Madduri et al., "A Faster Parallel Algorithm and Efficient Multithread Implementions for Evaluating Betweenness Centrality on Massive Datasets", dated 2009, 8 pages.

Madduri, Kamesh, "Scaling up graph algorithms on emerging multicore systems", Berkeley Lab, 22 pages.

Malewicz et al., "Pregel: A System for Large-Scale Graph Processing", in SIGMOD '10 Jun. 8, 2010, pp. 135-145.

Perez et al., "Ringo: Interactive Graph Analytics on Big-Memory Machines", ACM, SIGMOD, dated May 2015, 6 pages.

Schiller et al., "Efficient Data Structures for Dynamic Graph Analysis", IEEE, dated Nov. 2015, pp. 497-504.

Sevenich et al., "Using Domain-Specific Languages for Analytic Grpah Database", VLDB Endowment, dated Sep. 2016, pp. 1257-1268.

Sparsity Technologies, "Sparksee User Manual", API, http://www.sparsity-technologies.com/UserManual/API.html, 61 pages, dated 2015.

Then et al., "The More the Merrier: Efficient Multi-Source Graph Traversal", Proceedings of the VLDB Endowment, vol. 8 Issue 4, Dec. 2014, 12 pages.

Yanagisawa, "A Multi-Source Label-Correcting Algorithm for the All Pairs Shortest Paths Problem", dated 2010, IEEE, pp. 1-10.

Hong et al., "Simplifying Scalable Graph Processing with a Domain-Specific Language", ADM, CGO'14, pp. 208-218.

U.S. Appl. No. 13/733,424, filed Jan. 3, 2013, Office Action, dated Jul. 16, 2014.

U.S. Appl. No. 13/733,424, filed Jan. 3, 2013, Notice of Allowance, dated Aug. 28, 2014.

U.S. Appl. No. 13/733,424, filed Jan. 3, 2013, Office Action, dated Mar. 25, 2014.

U.S. Appl. No. 13/733,424, filed Jan. 3, 2013, Notice of Allowance, dated Jun. 16, 2014.

Then U.S. Appl. No. 14/710,117, filed May 15, 2015, Office Action, dated Oct. 11, 2017.

Sevenich, U.S. Appl. No. 14/805,897, filed Jul. 22, 2015, Office Action, dated Feb. 17, 2017.

Sevenich, U.S. Appl. No. 14/805,897, filed Jul. 22, 2015, Interview Summary, dated Oct. 26, 2017.

Sevenich, U.S. Appl. No. 14/805,897, filed Jul. 22, 2015, Final Office Action, dated Sep. 14, 2017.

* cited by examiner

FIG. 3

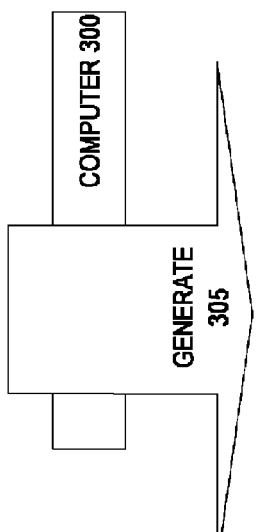

ORIGINAL LOOP 350

```
foreach(n: G.nodes) { // parallel iteration
    vertexProperty<double> alpha; // thread-local property
    edgeProperty<bool> beta; // thread-local property
}
```

DERIVED LOOP 355

```
long need = Runtime.getNumThreads() *
    (SIZE_OF_DOUBLE * G.numNodes() // size of 'node_prop'
    + SIZE_OF_BOOL * G.numEdges()); // size of 'edge_prop' long have = Runtime.getAvailableMemory();

int fanout = getAdjustedThreadCount(need,have); // compute new number of threads foreach(v: G.nodes, fanout) { // run parallel region with given amount of threads
    nodeProperty<double> node_prop;
    edgeProperty<bool> edge_prop;
    ...
}
```

FIG. 4

SEARCHES LOOP 450

```
// scalar variables
Int diameter;
String name;

foreach(n: G.nodes) { // parallel iteration over vertices in graph G
    inBFS(t: G.nodes from n) { // BFS starting from each vertex n
        // inner logic
        name = t.title;
        diameter = 2 * t.radius;
        Int a=diameter
        String b=name;
        ... // more statements that use a and b
    }
}
```

AUTOMATED GENERATION OF MEMORY CONSUMPTION AWARE CODE

FIELD OF THE DISCLOSURE

This disclosure relates to logic generation for multi-threaded graph analysis. Techniques are presented for generating logic that increases throughput by optimizing consumption of unused memory.

BACKGROUND

Graph analysis is a recently popularized way of analyzing data that may consider not only the properties of the entities but also relationships between them. Most algorithms for graph analysis are not very computation-intensive, but are heavily memory-bound. Also graph analysis algorithms are inherently parallel and graph analysis systems exploit this parallelism, for example by executing code with multiple threads.

In graph analysis, the original dataset is represented as a graph. Each data entity may be represented as a vertex within the graph. A relationship between two entities may be represented as an edge between corresponding vertices. Other information in the original dataset may be encoded as vertex or edge properties, which are values associated with vertices and edges. For example, a vertex that represents a person in the original dataset can be associated with extra properties such as a serial number, personal name, or street address.

Graph analysis may be used by many types of applications such as semantic webs, molecular networks, and social networks. A real-world graph dataset may be huge in size and time consuming to analyze. In order to accelerating large graph analysis, multiple central processing unit (CPU) cores are exploited by multithreaded computation. As such, an analytic computation may be simultaneously performed on different portions of a large graph. A large-scale server system may support hundreds or thousands of threads in hardware.

Multithreaded execution, however, may have drawbacks, such as increased memory consumption. Some graph analysis algorithms, when implemented with multithreading, need thread-local data structures for each thread to hold temporary or other local data. In some cases, each thread needs to keep a thread-local version of a vertex or edge property having a separate value for many or all vertices or edges of a graph. When using a large number of threads, this memory overhead may become problematic. For example, throughput may decline if accessing a huge graph causes thrashing of one or more memory tiers, such as static random access memory (RAM) of an on-chip cache or off-chip memory such as dynamic RAM or flash memory.

There are two ways of dealing with this problem. One way is to limit how many threads run concurrently. In other words, fewer threads are used so memory usage by thread locals does not exceed physical RAM capacity. The obvious downside is that the use of fewer threads (e.g. CPU cores) may increase analysis execution time.

Another way is to limit the amount of memory that each thread uses. This is applicable for graph algorithms that dispatch units of work. One example is multisource breadth-first search (MS-BFS), where each thread processes one batch of vertices at a time.

Various combinations of above two approaches may prevent memory exhaustion, but with different time-space tradeoffs. A user may apply either or both of the above two approaches. However, deciding on a good combination of approaches is challenging even for experienced users.

When too many threads are used, memory is exhausted. When too few threads are used, throughput declines. A user might not know how much thread-local memory is required by an analysis algorithm. A user who runs the analysis on a dataset might not have the design knowledge of a person who developed the analysis algorithm.

As such, optimal performance may be elusive. Hence, a user may go through several tuning iterations of trial-and-error until finding an acceptable balance between memory usage and execution speed. Often a risk of exhausting memory outweighs a need for maximum speed. As such, manual tuning tends to be conservative and suboptimal.

BRIEF DESCRIPTION OF THE DRAWINGS

In the drawings:

FIG. 3 is a block diagram that depicts logic transformation, in an embodiment;

FIG. 4 is a block diagram that depicts a parallel execution region, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
  2.1 Graph DSL
  2.2 Properties And Thread Locals
  2.3 Allocation Units
  2.4 Instrumentation Logic
  2.5 Tuning Logic
  2.6 Executions
3.0 Example Logic Generation Process
4.0 Green-Marl
5.0 Concurrent Searches
  5.1 Race Condition 6.0 MS-BFS
  6.1 Vertex Batching
  6.2 Batch Sizing
7.0 RDF
8.0 Hardware Overview

1.0 General Overview

Computerized techniques are provided for improving performance of graph analytics by generating logic that tunes concurrency for available memory. In an embodiment, graph analysis logic is enhanced to decrease horizontal scaling to avoid memory exhaustion. In an embodiment, graph analysis logic is enhanced to decrease the size of units of concurrent work to avoid memory exhaustion.

In an embodiment, graph analysis logic is enhanced to decrease the vertex batch size of multisource breadth-first search (MS-BFS) to avoid memory exhaustion. In an embodiment, concurrency for analysis of a huge resource description framework (RDF) graph is adjusted to avoid memory exhaustion.

In an embodiment, a computer analyzes domain specific language (DSL) logic that analyzes a graph having vertices and edges. Based on analyzing the DSL logic, the computer detects parallel execution regions that create thread-local properties. Each value of a thread-local property is associated with a respective vertex or a respective edge of the graph. For each parallel execution region, the computer calculates how much memory is needed to store one instance of each of the thread-local properties and generates the following logics. The computer generates instrumentation logic that, when executed before the parallel execution region, determines how many threads are available and how many vertices and edges will create thread-local properties. The computer also generates tuning logic that, when executed before the parallel execution region, determines how much memory is originally needed for the parallel execution region based on how much memory is needed to store the one instance, how many threads are available, and how large is the graph. The tuning logic detects a memory shortage based on the original amount of memory needed exceeding how much unused memory is available. The tuning logic adjusts the execution of the parallel execution region based on the detected memory shortage.

2.0 Example Computer

Figure 1:
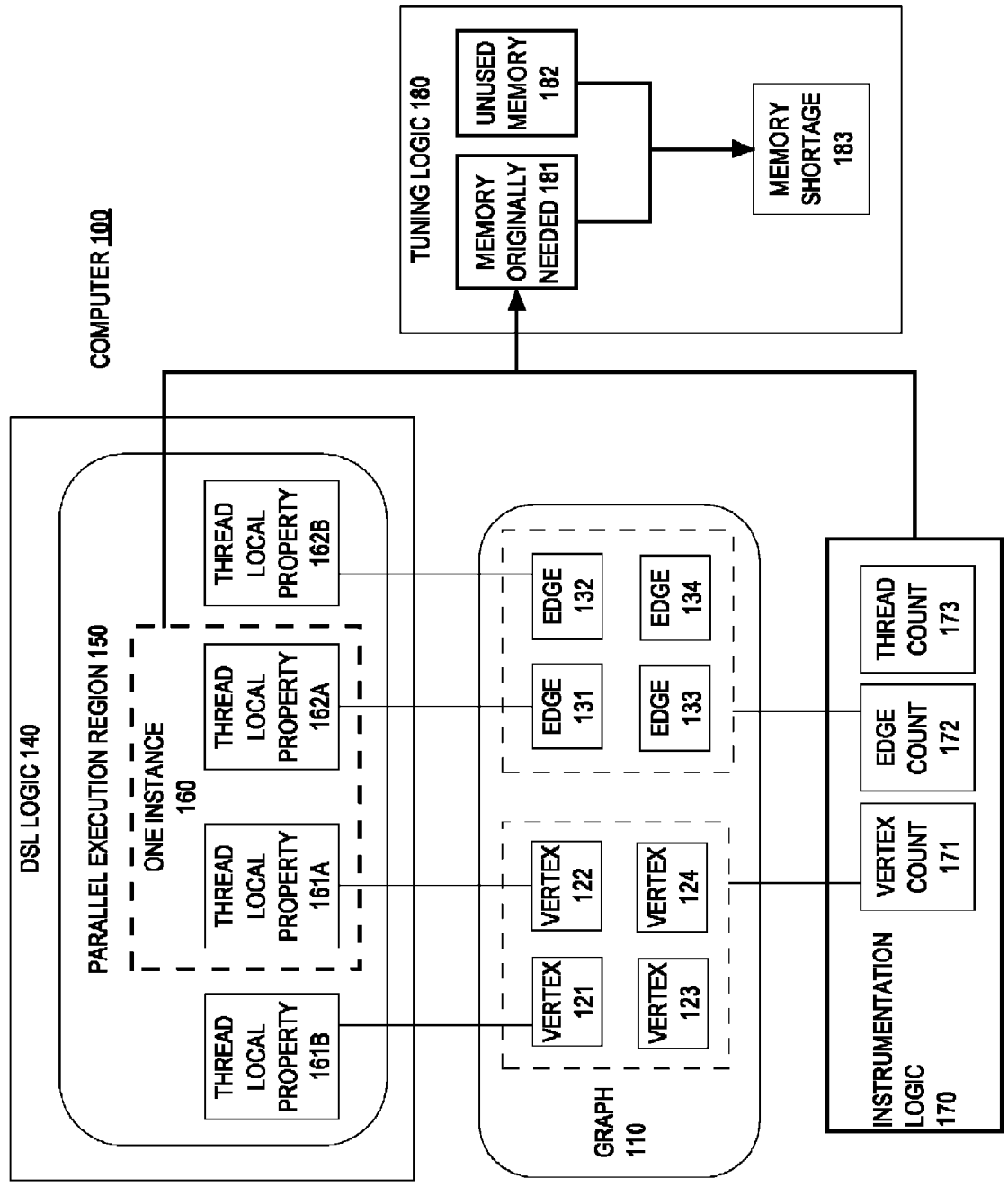
FIG. 1 is a block diagram that depicts an example computer that generates optimization logic, in an embodiment.

FIG. 1 is a block diagram that depicts an example computer 100, in an embodiment. Computer 100 improves performance of graph analytics by generating logic that tunes concurrency for available memory.

Computer 100 may be at least one computer capable of multithreading. Multithreading may be achieved by context switching, hyper-threading, multicore, symmetric multiprocessing (SMP), or other concurrency mechanism. Computer 100 may have a form factor such as a blade or other rack server, a personal computer, a mainframe, smartphone, or other computer enclosure.

2.1 Graph DSL

Initially, computer 100 includes domain specific language (DSL) logic 140 that specifies parallelizable graph analytics. DSL logic 140 may be textual source code. DSL logic 140 may reside in a file or in memory.

Typically, a DSL is a high level language, such as Green-Marl. In operation, computer 100 analyzes DSL logic 140 to detect at least one portion of graph analysis that may be parallelized, such as parallel execution region 150.

Parallel execution region 150 may be a breadth-first search, a foreach loop, or other block of code that processes at least a portion of a graph, such as 110. Graph 110 is shown for demonstration and need not be accessible to computer 100 nor exist when computer 100 analyzes DSL logic 140.

Later and although not shown, a derivative of DSL logic 140 will execute, although not necessarily on computer 100. However, when the derivative executes, it will analyze a graph such as 110.

2.2 Properties and Thread Locals

Computer 100 analyzes parallel execution region 150 to detect thread-local properties, such as 161-162. Thread-local properties are variables that are instantiated for each execution thread of a graph analysis.

As such, an amount of thread-local property instantiations may be directly proportional to an amount of threads. Consequentially, memory consumption by thread-local properties may practically limit the horizontal scalability of a computer that executes parallel execution region 150.

Each thread of parallel execution region 150 may operate in a way that requires one or more thread-local properties for each vertex or edge of graph 110. If graph 110 is a neural network with billions of vertices and trillions of edges, then the memory footprint of the thread-local properties may be so large that virtual memory thrashes or exhausts.

For example, a value for a double precision floating-point vertex property may consume eight bytes of memory. If graph 110 has a billion vertices, then that vertex property may need gigabytes of memory. If that vertex property is also a thread-local property for a thousand threads, then terabytes of memory may be needed.

Parallel execution region 150 may specify any amount of thread-local properties, such as 161-162. Each property may be instantiated for each vertex or edge. For example, thread-local property 161 is a vertex property that is instantiated for vertices 121-122 and shown as thread-local properties 161A-B. Likewise, thread-local property 162 is an edge property that is instantiated for edges 131-132 and shown as thread-local properties 161A-B.

2.3 Allocation Units

How many times a vertex or edge property is instantiated may depend on how many vertices or edges are in graph 110, although the size of graph 110 is unknown when computer 100 analyzes parallel execution region 150. For example, parallel execution region 150 may be applied to different graphs. Likewise, parallel execution region 150 may be applied to a subset of graph 110.

Because graph size is unknown, so too are the amount of instantiations of thread-local properties 161-162. However during analysis of parallel execution region 150, for memory estimation, computer 100 identifies a single instantiation of each of thread-local properties 161-162, shown together as one instance 160, which for demonstration is shown as including thread-local properties 161A and 162A.

One instance 160 is important because it defines a unitary memory allocation, for which actual allocations may be multiples of. For example, one instance 160 defines an amount of memory needed for one property of one vertex, shown as thread-local property 161A. This unitary amount of memory can be multiplied to calculate memory needed for multiple vertices, multiple threads, or both.

The memory size of one instance 160 may be statically determined during build time according to the sizes of the constituent properties 161A and 162A. For example in Green-Marl all vertex and edge properties have primitive data types of known fixed sizes.

If parallel execution region 150 specifies a property as a complex data structure, then the memory size of one instance 160 may be the sum of the sizes of the constituent fields of the data structure. Computer 100 is configured with a designated size for each primitive type that can be part of a complex data structure. The primitive sizes can be summed or multiplied as needed to calculate the size of a data structure based on the primitive sizes.

2.4 Instrumentation Logic

Computer 100 analyzes parallel execution region 150 to generate logic needed to optimize multithreading for available memory. In an embodiment, computer 100 inserts the generated logic into a copy of DSL logic 140. In an embodiment, computer 100 cross-compiles DSL logic 140 into a general-purpose programming language such as C++ or Java and inserts the generated logic into the emitted C++ or Java logic. In an embodiment, computer 100 compiles DSL logic 140 to binary such as bytecode or machine instructions and inserts the generated logic into the binary.

In any case, the logic generated by computer 100 includes instrumentation logic 170 and tuning logic 180. Although logics 170 and 180 are shown as separate logics, in an embodiment, logics 170 and 180 are combined into a single logic.

As explained above, computer 100 analyzes logic 140 and generates logics 170 and 180, but it need not execute them. Whichever computer subsequently analyzes graph 110 will execute logics 140, 170, and 180.

However, logics 170 and 180 are configured to execute before DSL logic 140. This is because logics 170 and 180 determine dynamic quantities needed to tune the concurrency of parallel execution region 150.

Instrumentation logic 170 detects the scale of the graph analysis to be performed by an invocation of parallel execution region 150. Instrumentation logic 170 recognizes which subset of graph 110 is processed by parallel execution region 150.

Instrumentation logic 170 determines vertex count 171 and edge count 172 by determining how many respective vertices and edges of graph 110 will be processed by parallel execution region 150. For example if parallel execution region 150 is a foreach loop over a subset of vertices, then vertex count 171 is the size of that subset.

Instrumentation logic 170 also determines thread count 173, which is a nominal amount of threads that parallel execution region 150 should use. For example, an amount of threads may be specified within parallel execution region 150 or elsewhere within DSL logic 140. Alternatively, an amount of threads may be the size of a thread pool, an amount of central processing unit (CPU) cores, a fraction of vertex count 171, or a reasonable constant such as twenty.

For example if instrumentation logic 170 is Java source or Java bytecode, then it may invoke Runtime.availableProcessors( ) or one of various methods of ThreadPoolExecutor as part of determining thread count 173. Alternatively in Linux, instrumentation logic 170 may read the /proc/cpuinfo file.

Thread count 173 is aspirational and represents a concurrency ceiling. An actual degree of concurrency for parallel execution region 150 may be lower than thread count 173.

2.5 Tuning Logic

Computer 100 also generates tuning logic 180, which runs after instrumentation logic 170 and uses the counts obtained by logic 170. Tuning logic 180 takes the memory size of one instance 160 and scales it upward by multiplying it times thread count 173 and times whichever or both of vertex count 171 and edge count 172 are relevant to the thread-local properties of parallel execution region 150.

The result of this multiplication is memory originally needed 181. For example, originally needed 181 may be calculated according to this formula:

$$\pi(G, NP, EP, t) = t \cdot (\Sigma_{p \in NP} sizeof(type_p) \cdot |V_G| + \Sigma_{p \in NP} sizeof(type_p) \cdot |E_G|)$$

In the above formula, G is graph 110, NP are vertex properties such as 161, EP are edge properties such as 162, and t is thread count 173. $V_G$ are vertices 121-124, and $E_G$ are edges 131-134.

Originally needed 181 is an estimate of how much memory would be needed by parallel execution region 150 if maximum concurrency were achieved according to desired thread count 173. However, computer 100 may lack enough memory to satisfy memory originally needed 181.

Tuning logic 180 also determines unused memory 182 by detecting how much memory is actually available. In a Java embodiment, tuning logic 180 may invoke one of various methods of Runtime or MemoryUsage for a memory tally.

Tuning logic 180 subtracts unused memory 182 from memory originally needed 181 to calculate memory shortage 183, which is a numeric amount of memory lacking. If unused memory 182 exceeds memory originally needed, then sufficient memory is available, and parallel execution region 150 may comfortably run without adjustment according to thread count 173.

However, is memory shortage 183 measures an actual shortage, then parallel execution region 150 does not have enough memory to run as configured. Tuning logic 180 responds to memory shortage 183 by adjusting the configuration of parallel execution region 150 to accommodate constrained memory.

For example, tuning logic 180 may configure parallel execution region 150 to use fewer threads than are either available or specified by thread count 173. A reduction in threads may be inversely proportional to the size of memory shortage 183. Tuning logic 180 may calculate a maximum number of threads that parallel execution region 150 may use without exhausting memory.

In an embodiment, parallel execution region 150 is parallelized according to units of work of a same size, perhaps with work stealing. As such, tuning logic 180 may tune the size of the unit of work, instead of tuning an amount of threads. For example, tuning logic 180 may tune the batch size of a multisource breadth-first search (MS-BFS), as discussed later herein.

2.6 Executions

DSL logic 140 may have many different parallel execution regions 150. Each parallel execution region 150 may be invoked at different times for different subsets of graph 110. Furthermore, the amount of free memory and free threads may fluctuate while DSL logic 140 runs.

As such, the quantities determined by logics 170 and 180 before one invocation of parallel execution region 150 might not be valid for subsequent invocations of the same or other parallel execution regions. Therefore, logics 170 and 180 should be re-invoked before each separate invocation of any parallel execution region. In an embodiment some of the quantities determined by logics 170 and 180 may be cached for reuse by subsequent invocations.

3.0 Example Logic Generation Process

Figure 2:
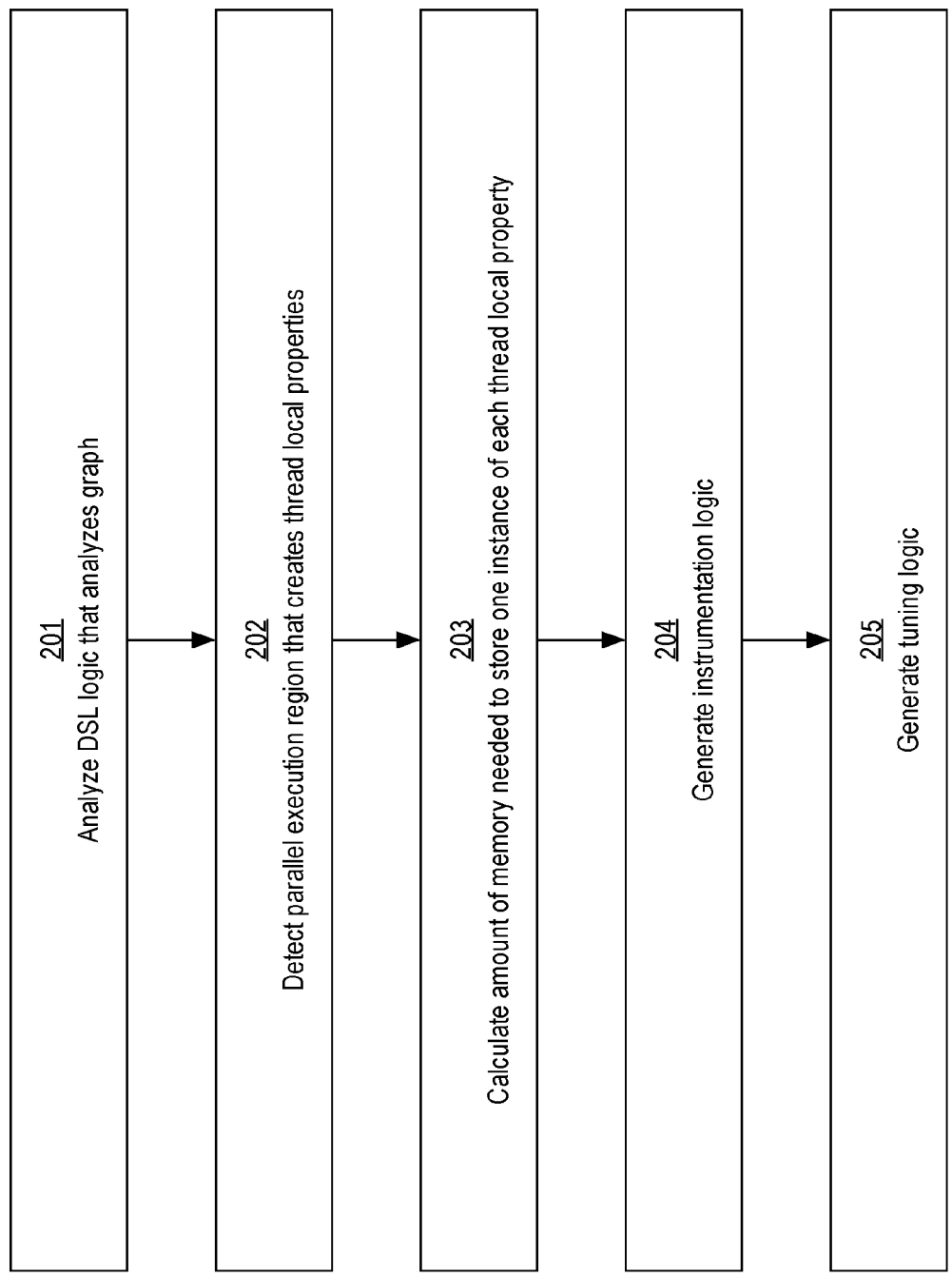
FIG. 2 is a flow diagram that depicts an example process for generating optimization logic, in an embodiment.

FIG. 2 is a flow diagram that depicts an example process that generating logic that tunes concurrency for available memory, in an embodiment. The logic generation process is described in the context of FIG. 1.

In step 201, graph analytic DSL logic is analyzed. For example, computer 100 analyzes DSL logic 140. Computer 100 may use a DSL compiler, a DSL parser, or other static analysis tool to parse DSL logic 140 into an internal format for control flow and data flow analysis. Computer 100 may generate within memory an abstract syntax tree (AST) that represents DSL logic 140.

In step 202, a parallel execution region that creates thread-local properties is detected within the DSL logic. For example, computer 100 may recognize a parallelizable control flow structure, such as a foreach loop, that specifies graph analysis. Computer may compare portions of DSL logic 140 to structural templates as a means of recognizing source logic patterns that specify parallelizable graph analysis.

If computer 100 detects parallel execution region 150 within DSL logic 140, then computer 100 detects which properties does parallel execution region 150 create. Not all properties used by parallel execution region 150 are relevant. For example, parallel execution region 150 may use a property that pre-exists the invocation of parallel execution region 150. Only properties that parallel execution region 150 actually creates are important for tuning.

In step 203, an amount of memory needed to store one instance of each thread-local property is calculated. For example, computer 100 identifies one instance 160 that contains one instance of each of thread-local properties 161-162. Computer 100 calculates the memory size of one instance 160. As explained above, this calculation may occur in sequence between steps 202 and 204 or, due to an implementation constraint, deferred until later, such as during graph analysis runtime.

In step 204, instrumentation logic is generated. For example, computer 100 generates instrumentation logic 170 that determines runtime quantities. Computer 100 inserts instrumentation logic 170 into the target logic. The target logic may be a copy, a cross-compilation, or a binary compilation of DSL logic 140.

The insertion is such that instrumentation logic 170 is configured to run before parallel execution region 150 runs. If multiple parallel execution regions 150 are detected, then computer 100 may generate and insert the body of instrumentation logic 170 once as a reusable subroutine and then insert an invocation to the subroutine before each distinct parallel execution region 150.

In step 205, tuning logic is generated. For example, computer 100 generates tuning logic 180 that adjusts the concurrency of parallel execution region 150. Tuning logic 180 is configured to execute after instrumentation logic 170 and before parallel execution region 150. The insertion of tuning logic 180 may occur as described above for instrumentation logic 170. During graph analysis, tuning logic 180 may detect that memory exhaustion cannot be avoided, even with optimal tuning. In such a case, tuning logic 180 may report such failure, perhaps by returning an error code or throwing an exception.

For a single analysis of DSL logic 140 during step 201, computer 100 may repeat steps 202-205 for each distinct parallel execution region 150 that is detected within DSL logic 140. As such, target logic may contain as many logics 170 and 180 as there are parallel execution regions 150 within DSL logic 140.

The target logic includes logics 170, 180, and a translation or copy of logic 140. Computer 100 may emit the target logic as part of a reusable code archive such as a Java archive (JAR), as an executable program, as code source files, as relocatable object modules such as classfiles or C++.o files, or as another code distribution format. Alternatively, the target logic may be consumed internally by the same program that generates it, such as when a custom class loader enhances existing classes during linking or loading or when a DSL interpreter executes a script that contains DSL logic 140.

4.0 Green-Marl

FIG. 3 depicts example computer 300, in an embodiment. Example computer 300 analyzes a Green-Marl graph analysis script and generates concurrency optimization logic for the script. Example computer 300 may be an implementation of computer 100.

The Green-Marl script contains at least one original loop 350 that specifies a foreach loop over the vertices of a graph, shown as original loop 350. While analyzing the Green-Marl script, computer 300 detects original loop 350 and recognizes that loop 350 is amenable to parallelization.

Computer 300 also identifies within original loop 350 that vertex property alpha and edge property beta are thread-local properties. Because all Green-Marl properties have a primitive data type of known size, computer 300 readily calculates the combined size of a single instance of each thread-local property.

Having analyzed original loop 350, computer 300 generates additional logic, shown as generate 305. During generate 305, computer 300 generates instrumentation logic and tuning logic. Computer 300 transforms original loop 350 and combines the transformed loop with the instrumentation logic and tuning logic, all of which are emitted as derived loop 355.

In this example, computer 300 does not compile or cross-compile the original Green-Marl script into another language or instruction set. Instead, computer 300 emits derived loop 355 as a Green-Marl enhancement of original loop 350.

The first Green-Marl statement of derived loop 355 declares variable 'need' whose initializer implements the instrumentation logic that determines dynamic quantities such as graph size and desired thread count. This is the amount of memory needed to fully parallelize the execution of derived loop 355.

The second Green-Marl statement declares variable 'have' whose initializer implements that part of the tuning logic that detects idle memory. The third Green-Marl statement declares variable 'fanout' whose initializer, as another part of the tuning logic, calculates how many threads should derived loop 355 actually use. Also as part of the tuning logic, the calculated fanout is passed as an argument into the foreach loop to configure the degree of concurrency of the loop. When the foreach loop runs, it will use an amount of threads that is specified by the fanout variable.

5.0 Concurrent Searches

FIG. 4 depicts another example Green-Marl foreach loop, in an embodiment. Searches loop 450 encodes multiple breadth-first searches that run concurrently.

Breadth-first search (BFS) is an algorithm that traverses the vertices and edges of a graph in search of a particular pattern. BFS iteratively examines the vertices and edges at a particular distance (a horizon) away from a starting vertex. After each iteration, the horizon distance is increased slightly, and the next iteration examines vertices and edges at the increased horizon. In this way, BFS can explore many distinct paths through the graph. The search continues until a termination criterion is satisfied or until the graph is exhausted.

The concurrent BFSs of searches loop 450 are readily implemented using coarse-grained threading with symmetric multiprocessing (SMP), such as with a multicore CPU. SMP relies on shared memory.

In this example, searches loop 450 begins with declarations of two variables, which are diameter and name. These variables are scalars, which are not vertex or edge properties.

During code generation, a computer may recognize scalar variables, such as diameter and name in searches loop 450. The computer may configure searches loop 450 to allocate a replica of a scalar variable for each thread of the concurrent search.

6.0 MS-BFS

Figure 5:
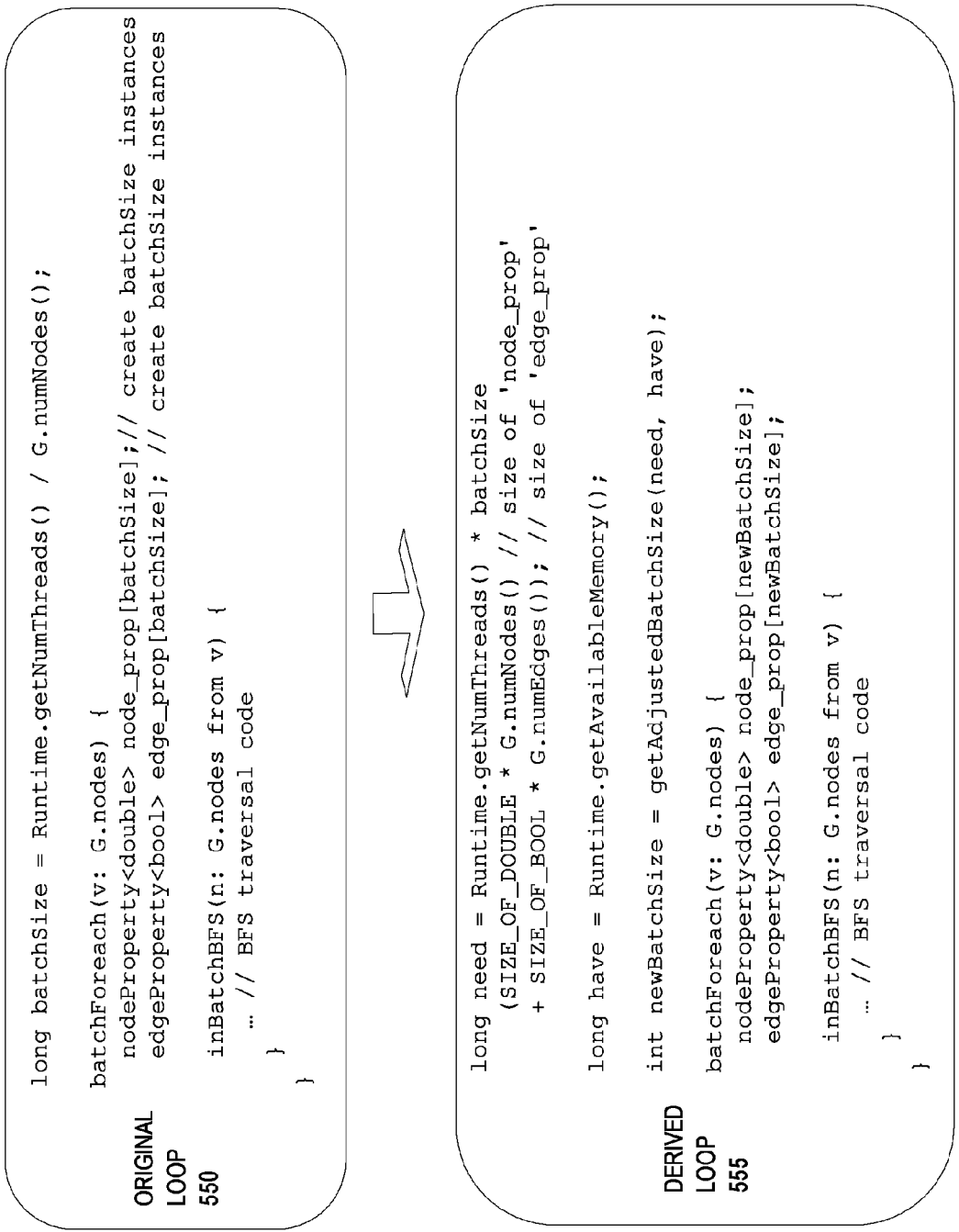
FIG. 5 is a block diagram that depicts logic transformation for batch size tuning, in an embodiment.

FIG. 5 depicts another example Green-Marl foreach loop, before and after logic generation, in an embodiment. Original loop 550 combines concurrent BFSs into a multisource BFS (MS-BFS).

MS-BFS improves on traditional BFS in a few ways. MS-BFS is optimized for multiple starting vertices. Each starting vertex has its own BFS. Some of the BFSs may run concurrently. Other BFS may be batched into a shared thread. In either case, some BFSs may share intermediate results with each other. When the traversals of multiple BFSs overlap at the same vertex, the sharing of intermediate results means that each edge need be traversed only once, regardless of how many BFSs run.

6.1 Vertex Batching

MS-BFS may perform vertex batching, which is a technique to limit task parallelism. MS-BFS may process each source vertex or each neighbor vertex at a same horizon level in a separate thread. Vertex batching combines vertices into subsets such that each batch processes a subset of vertices. Batches need not have equal amounts of vertices, although uniformity may increase load balancing.

Each batch may have its own thread. A batch is a unit of work that may be queued while waiting for a spare thread to become available. The vertices of a batch may be sequentially processed by a thread.

MS-BFS may be configured to allocate a thread-local replica of each vertex or edge property for each vertex of a batch. A scalar variable may have a thread-local replica for each vertex of a batch.

6.2 Batch Sizing

The memory needed for these thread locals is directly proportional to the amount of vertices in a batch. The batchSize variable of original loop 550 specifies a desired amount of vertices per batch. A desired batch size may be calculated based on how many threads are available or how large is a graph. However if the desired batch size is too big, then there may be insufficient memory for thread locals.

For example, thread-local memory consumption may be calculated according to this formula:

$$\pi(G,NP,EP,t,b)=tb \cdot (\Sigma_{p \in NP}{}^{sizeof(type_p)} \cdot |V_G| + \Sigma_{p \in NP}{}^{sizeof(type_p)} \cdot |E_G|)$$

In the above formula, b is the batch size.

Generation and insertion of instrumentation and tuning logic causes original loop 550 to be transformed into derived loop 555. Derived loop 555 accomplishes concurrency tuning in a special way that need not adjust how many threads run.

Instead, derived loop 555 tunes concurrency by adjusting the batch size before starting a parallel execution region. During a memory shortage, batch size is reduced by an amount that causes a sufficient reduction in demand for thread-local storage.

7.0 RDF

Figure 6A:
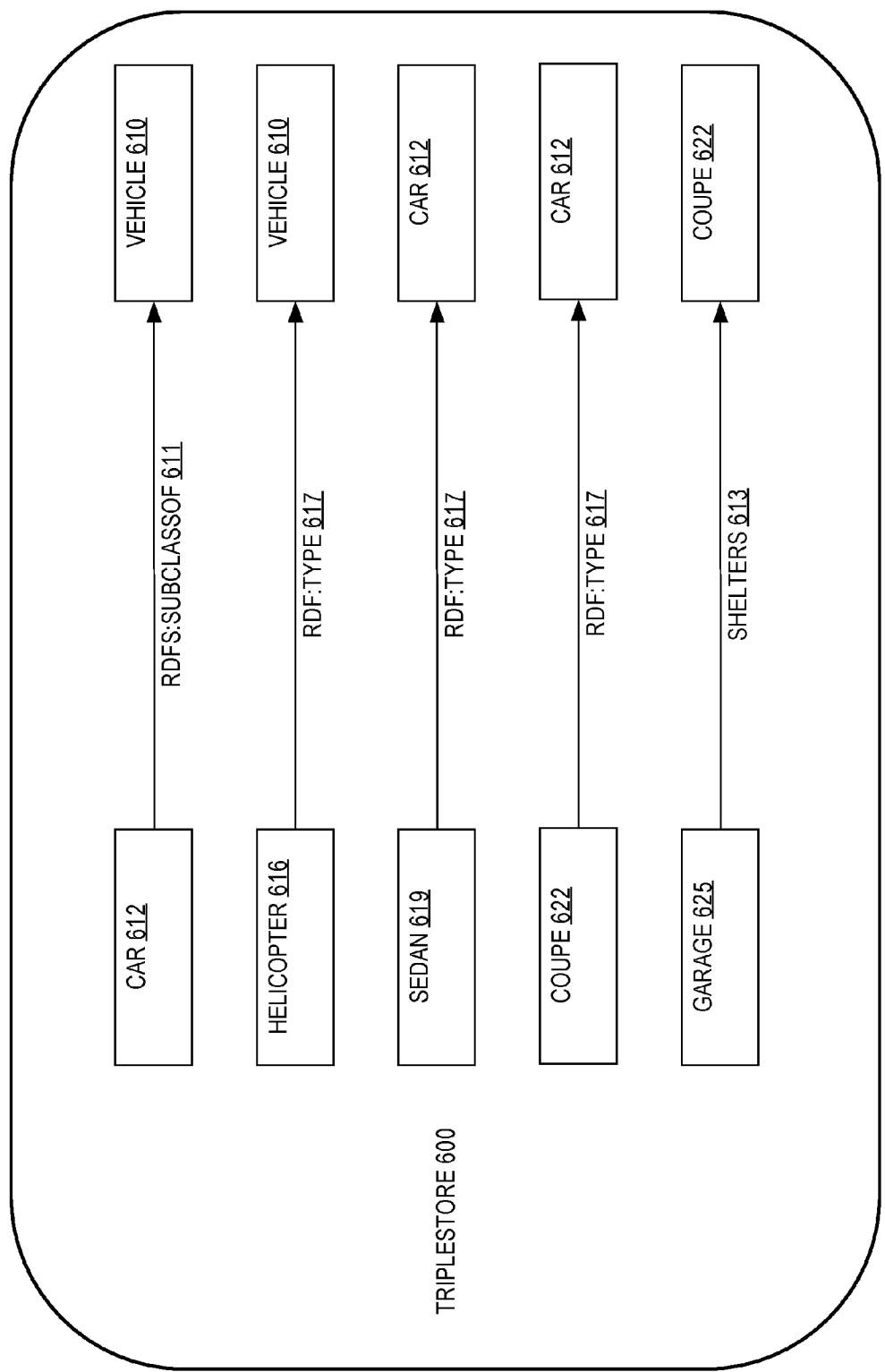
FIG. 6A is a block diagram that depicts triples in a triplestore, in an embodiment.
Figure 6B:
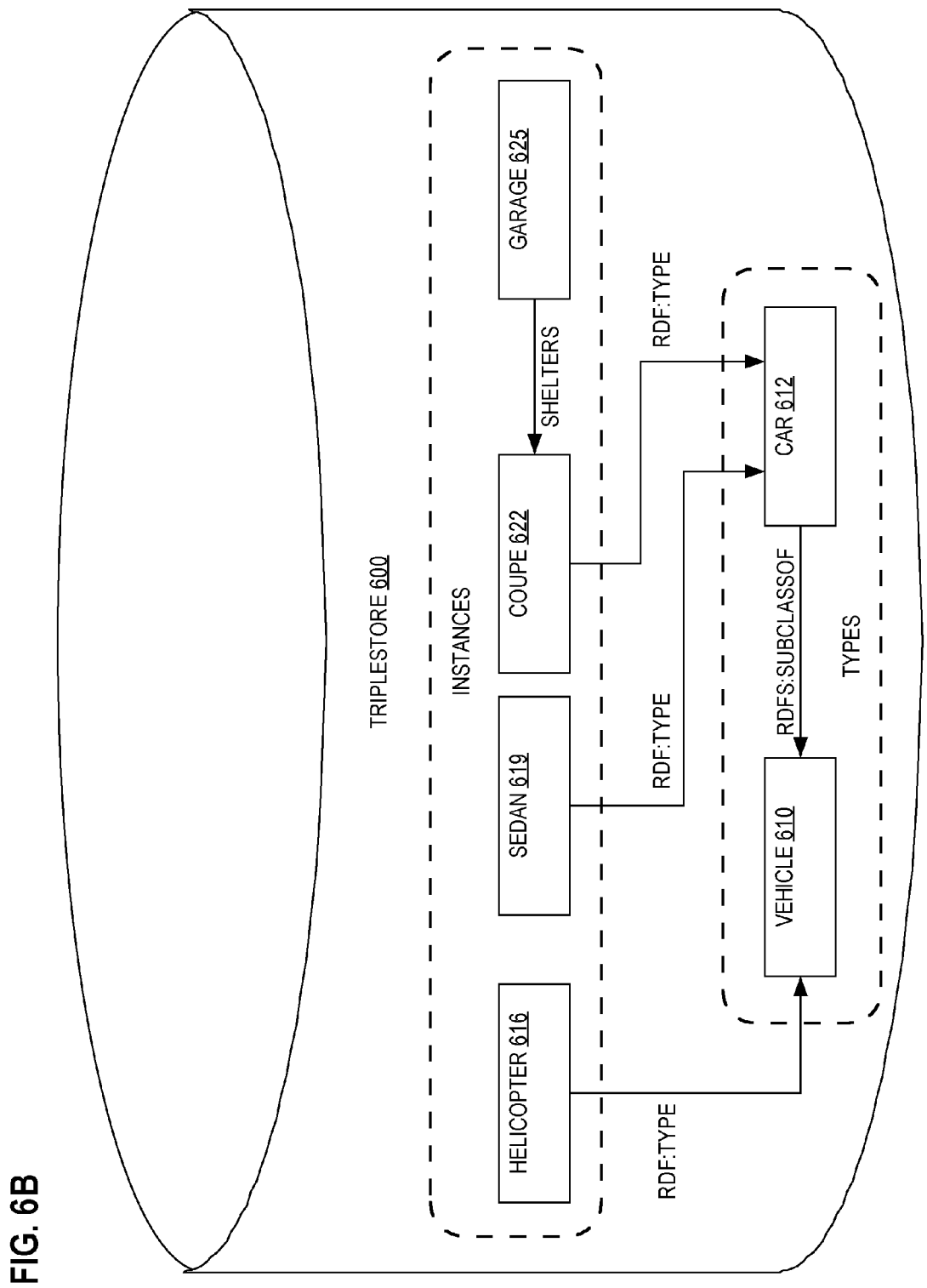
FIG. 6B is a block diagram that depicts a graph in a triplestore, in an embodiment.

FIG. 6A-6B depict an example resource description framework (RDF) triplestore 600, in an embodiment. Triplestore 600 is a database that contains a knowledge graph composed of RDF triples. Hence, graph analytics tuning techniques described herein are readily applicable to the contents of triplestore 600.

Each triple within triplestore 600 is shown in FIG. 6A as a row. For example the top row shows a triple that defines car 612 to be a subclass 611 of vehicle 610.

A graph is composed by joining the triples together that share a common element. For example, the top two rows of triplestore 600 define an inheritance tree that has vehicle 610 as a root vertex and car 612 and helicopter 616 as neighbor vertices. In this way, each triple may be an edge within a graph.

FIG. 6B shows the contents of triplestore 600 as a graph. Depending on the volume and richness of the contents of triplestore 600, queries and searches of triplestore 600 may reveal valuable insights that are not readily inferred by relational data warehouse tools, such as Hive.

For example, an individual Oracle Exadata computer lead the industry by storing and analyzing an RDF graph with over a trillion edges (triples). Whereas, the Semantic Web of RDF that is distributed across the World Wide Web is so huge that techniques for estimating its size are still emerging. The size of the Semantic Web is without estimate and still growing. As such, huge RDF graphs are an application that is ripe for concurrency tuning of graph analytics.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
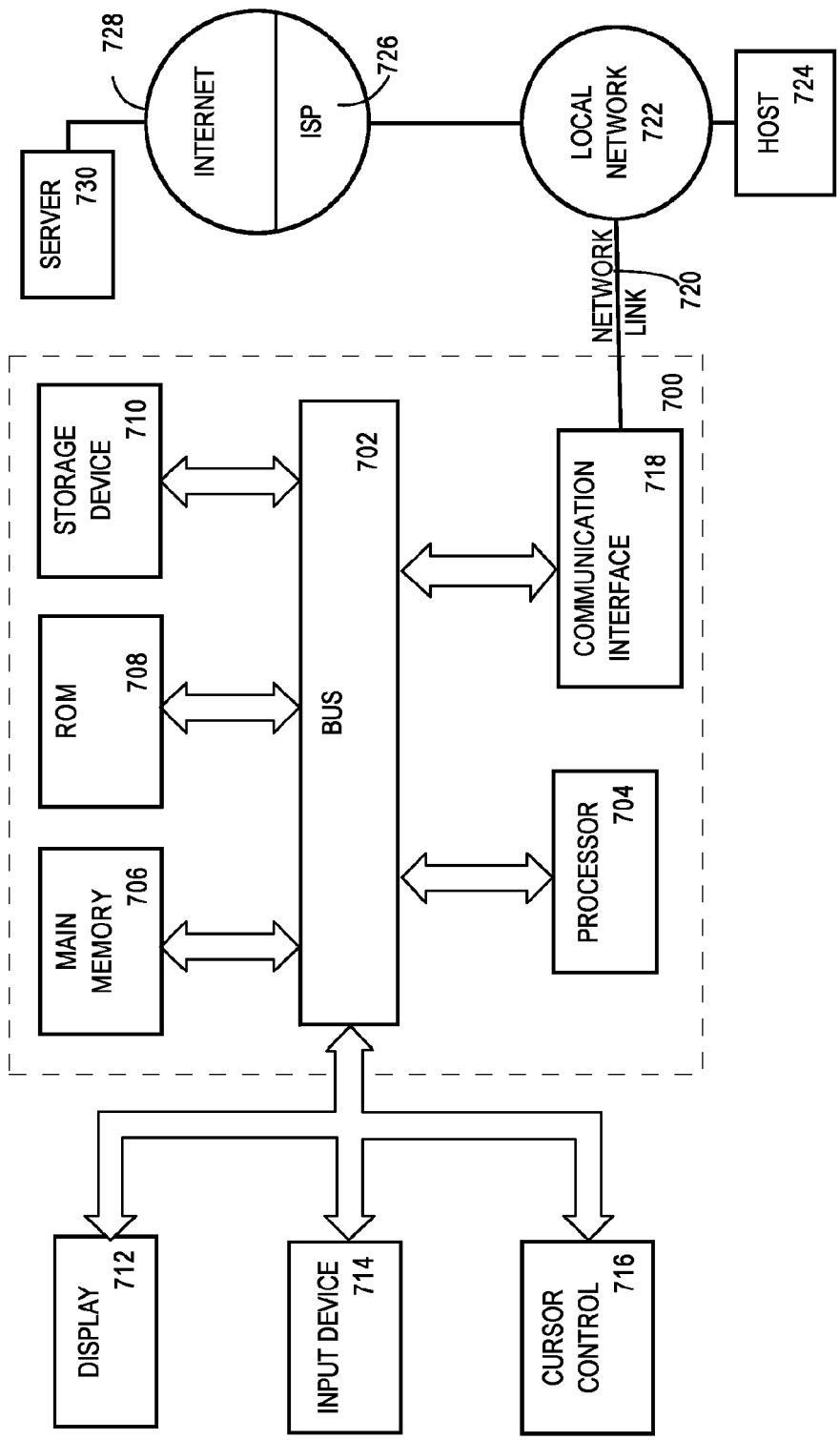
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    analyzing domain specific language (DSL) logic that analyzes a graph comprised of a plurality of vertices and a set of edges;
    based on said analyzing said DSL logic, detecting at least one parallel execution region that creates one or more thread-local properties, wherein each of said one or more thread-local properties is associated with a respective vertex of said plurality of vertices or a respective edge of said set of edges;
    for each of said at least one parallel execution region, performing:
        calculating an amount of memory needed to store one instance of each of the one or more thread-local properties of the parallel execution region;
        generating instrumentation logic that, when executed before an execution of the parallel execution region, determines at least one of:
            a count of threads that are available for said execution of the parallel execution region,
            a count of vertices of the plurality of vertices for which the parallel execution region will create thread-local properties, and
            a count of edges of the set of edges for which the parallel execution region will create thread-local properties;
        generating tuning logic that, when executed before an execution of the parallel execution region, performs:
            determining an original amount of memory needed for said execution of the parallel execution region based on at least one of: said amount of memory needed to store one instance, said count of threads, said count of vertices, and said count of edges;
            detecting a memory shortage based on said original amount of memory needed exceeding an amount of unused memory that is available to said execution of the parallel execution region; and
            adjusting said execution of said parallel execution region based on said detecting a memory shortage.

2. The method of claim 1 wherein adjusting said execution of the parallel execution region comprises configuring said execution of the parallel execution region to use an amount of threads that is less than said count of threads that are available.

3. The method of claim 1 wherein:
    analyzing said DSL logic comprises detecting a specification of a multisource breadth first search (MS-BFS);
    determining an original amount of memory needed comprises determining an original vertex batch size based on at least one of: said count of threads, said count of vertices, and said count of edges;
    adjusting said execution of said parallel execution region comprises configuring said execution of the parallel execution region to use a vertex batch size that is less than said original vertex batch size.

4. The method of claim 1 wherein adjusting said execution of the parallel execution region comprises throwing an exception that indicates said memory shortage.

5. The method of claim 1 wherein said parallel execution region comprises a foreach block.

6. The method of claim 1 wherein said parallel execution region comprises at least part of a breadth first search (BFS).

7. The method of claim 1 wherein said DSL logic comprises Green-Marl statements.

8. The method of claim 1 wherein generating instrumentation logic comprises generating statements of at least one language of: C++ or Java.

9. The method of claim 1 wherein generating instrumentation logic comprises generating at least one of: bytecode instructions or machine instructions.

10. The method of claim 1 wherein the set of edges of said graph comprises resource description framework (RDF) triples.

11. One or more non-transitory computer-readable media storing instructions that, when executed by one or more processors, cause:
    analyzing domain specific language (DSL) logic that analyzes a graph comprised of a plurality of vertices and a set of edges;
    based on said analyzing said DSL logic, detecting at least one parallel execution region that creates one or more thread-local properties, wherein each of said one or more thread-local properties is associated with a respective vertex of said plurality of vertices or a respective edge of said set of edges;
    for each of said at least one parallel execution region, performing:
        calculating an amount of memory needed to store one instance of each of the one or more thread-local properties of the parallel execution region;
        generating instrumentation logic that, when executed before an execution of the parallel execution region, determines at least one of:
            a count of threads that are available for said execution of the parallel execution region,
            a count of vertices of the plurality of vertices for which the parallel execution region will create thread-local properties, and
            a count of edges of the set of edges for which the parallel execution region will create thread-local properties;
        generating tuning logic that, when executed before an execution of the parallel execution region, performs:
            determining an original amount of memory needed for said execution of the parallel execution region based on at least one of: said amount of memory needed to store one instance, said count of threads, said count of vertices, and said count of edges;
            detecting a memory shortage based on said original amount of memory needed exceeding an amount of unused memory that is available to said execution of the parallel execution region; and
            adjusting said execution of said parallel execution region based on said detecting a memory shortage.

12. The one or more non-transitory computer-readable media of claim 11 wherein adjusting said execution of the parallel execution region comprises configuring said execution of the parallel execution region to use an amount of threads that is less than said count of threads that are available.

13. The one or more non-transitory computer-readable media of claim 11 wherein:
    analyzing said DSL logic comprises detecting a specification of a multisource breadth first search (MS-BFS);
    determining an original amount of memory needed comprises determining an original vertex batch size based on at least one of: said count of threads, said count of vertices, and said count of edges;
    adjusting said execution of said parallel execution region comprises configuring said execution of the parallel execution region to use a vertex batch size that is less than said original vertex batch size.

14. The one or more non-transitory computer-readable media of claim 11 wherein adjusting said execution of the parallel execution region comprises throwing an exception that indicates said memory shortage.

15. The one or more non-transitory computer-readable media of claim 11 wherein said parallel execution region comprises a foreach block.

16. The one or more non-transitory computer-readable media of claim 11 wherein said parallel execution region comprises at least part of a breadth first search (BFS).

17. The one or more non-transitory computer-readable media of claim 11 wherein said DSL logic comprises Green-Marl statements.

18. The one or more non-transitory computer-readable media of claim 11 wherein generating instrumentation logic comprises generating statements of at least one language of: C++ or Java.

19. The one or more non-transitory computer-readable media of claim 11 wherein generating instrumentation logic comprises generating at least one of: bytecode instructions or machine instructions.

20. The one or more non-transitory computer-readable media of claim 11 wherein the set of edges of said graph comprises resource description framework (RDF) triples.

* * * * *